United States Patent
Hartt

[11] Patent Number: 5,940,014
[45] Date of Patent: Aug. 17, 1999

[54] VEHICULAR APPROACH GUIDANCE METHOD AND SYSTEM

[76] Inventor: Joseph R. Hartt, 9384 E. Conquistadores Dr., Scottsdale, Ariz. 85255

[21] Appl. No.: 08/661,941

[22] Filed: Jun. 11, 1996

[51] Int. Cl.⁶ ....................................................... B64F 1/18
[52] U.S. Cl. ........................... 340/953; 340/954; 340/955
[58] Field of Search ..................................... 340/953, 954, 340/956, 955, 958, 947, 951, 952; 73/178 T; 244/114 R

[56] References Cited

U.S. PATENT DOCUMENTS

| | | | |
|---|---|---|---|
| 1,638,369 | 8/1927 | Skaupy . | |
| 1,809,785 | 6/1931 | Lackner . | |
| 1,966,059 | 7/1934 | Chiera ........................................ | 240/1.1 |
| 2,113,553 | 4/1938 | Dover ......................................... | 177/329 |
| 2,155,295 | 4/1939 | Bartow ....................................... | 240/1.2 |
| 2,515,236 | 7/1950 | Kunins ....................................... | 240/3.1 |
| 2,549,860 | 4/1951 | Swanson .................................... | 340/952 |
| 2,603,699 | 7/1952 | Roper ......................................... | 177/327 |
| 2,938,192 | 5/1960 | Adler, Jr. . | |
| 2,989,727 | 6/1961 | Germeshausen .......................... | 340/953 |
| 3,134,959 | 5/1964 | Calvert et al. . | |
| 3,436,729 | 4/1969 | Zurcher . | |
| 3,617,794 | 11/1971 | Van Bakel et al. ...................... | 313/112 |
| 3,706,968 | 12/1972 | Turner, Jr. . | |
| 4,170,767 | 10/1979 | Tanner ....................................... | 340/955 |
| 4,346,430 | 8/1982 | Holland ...................................... | 362/62 |
| 4,707,696 | 11/1987 | Task et al. ................................ | 340/954 |
| 5,043,726 | 8/1991 | Shifrin ....................................... | 340/953 |
| 5,119,090 | 6/1992 | Briatte ....................................... | 340/953 |
| 5,136,288 | 8/1992 | Briatte ....................................... | 340/953 |
| 5,287,104 | 2/1994 | Shemwell ................................. | 340/953 |

Primary Examiner—Brent A. Swarthout
Attorney, Agent, or Firm—Arnold, White & Durkee

[57] ABSTRACT

A method and system for visually guiding a vehicle to an approach corridor and subsequent landing, parking, or docking zone. As a vehicle approaches the designated landing, parking, or docking zone, the pilot is visually guided into the approach corridor by one or more pairs of guidance light units. Each guidance light unit has at least an affirmative color light segment and a negative color light segment. The affirmative color light segment indicates affirmative approach, landing, parking, or docking conditions and the negative color light segment indicates negative approach, landing, parking, or docking conditions. The colored light segments of the guidance light units are positioned and oriented such that the affirmative color light segment either corresponds with the approach corridor or provides visual guidance to assist the pilot in guiding the vehicle into the approach corridor by defining outwardly extending guidance corridors. In addition to defining an approach corridor or outwardly extending guidance corridors, the guidance light units may be used to provide landing, parking, or docking zone information or vehicle position or attitude information relative to the approach corridor or landing, parking, or docking zone.

6 Claims, 3 Drawing Sheets

VEHICULAR APPROACH GUIDANCE METHOD AND SYSTEM

FIELD OF THE INVENTION

The present invention relates generally to a vehicular approach guidance system, and, more particularly, to an improved method and system for visually guiding a vehicle to an approach corridor and a subsequent landing, parking, or docking zone.

BACKGROUND OF THE INVENTION

As a vehicle approaches a landing, parking, or docking zone, the pilot or vehicle operator must begin to position the vehicle for landing, parking, or docking. As used herein the term "landing zone" refers to any type of landing, parking or docking zone, including but not limited to, airport runways and taxiways, off-shore platform landing zones, oil pipeline work landing zones, military landing zones, shipboard landing zones, helicopter operation landing zones, helipads, marine docks, aircraft parking docks, spacecraft docks, or any other type of landing, parking, or docking zone for a vehicle. Furthermore, as used herein, the term "pilot" refers to any type of vehicle pilot or operator of a vehicle.

Various systems exist which provide information to the pilot of a vehicle to assist in finding and entering the appropriate approach position, or "approach corridor," for a landing zone. An approach corridor is a landing zone approach area of space bounded generally by edges of demarcation which are determined by the type of vehicle being piloted and the physical shape and location of the landing zone. An approach corridor may extend upwardly from the ground or body of water and indefinitely in any direction or angle outward from a landing zone.

Approach corridor information may be supplied to the pilot of a vehicle by ground-based radar systems, radio frequency systems, ground communication lines, laser guidance systems, aircraft-mounted global positioning systems, satellite global positioning systems, or visual ground lighting systems, either alone or in combination with each other. The selection of an appropriate vehicular guidance system depends on the size, location, environment, etc., of the landing zone and the type of vehicle typically landing, parking, or docking at the particular landing zone.

Most existing guidance systems are expensive and/or difficult to install or maintain. Furthermore, the cost of an existing ground-based guidance system includes not only the system hardware and maintenance, but the cost of the real estate required for the system. For example, many current approach guidance systems cost in excess of one million dollars and the installation costs may be substantially higher if the guidance system is a ground-based system located in high-cost real estate areas or over water approaches.

Guidance systems which use ground-based lights to orient an approaching vehicle to a landing zone often include threshold lights. In general, current landing zone threshold lights are standard horizontal filament electric lamps covered by a weatherproof two-color lens made of glass or plastic. The lens resembles an inverted bottle which is either all red or is split vertically, half red, half green. The split lens is designed to emit red light toward an aircraft landing zone (to identify the landing zone end to a braking vehicle) and green light toward the vehicle making an approach (to identify the landing zone threshold over which the vehicle must pass before touch down).

SUMMARY OF THE INVENTION

The present invention provides a method and system for visually guiding a vehicle to an approach corridor and subsequent landing zone. As a vehicle approaches a landing zone equipped with the present system, the pilot is visually guided into the approach corridor. The present guidance system includes one or more pairs of guidance light units. Each guidance light unit has at least two different colored light segments which enable the guidance light unit to emit at least two different colors of lights. One color of light corresponds to an affirmative color light segment and indicates affirmative approach, landing, parking, or docking conditions. The other color of light corresponds to a negative color light segment and indicates negative approach, landing, parking, or docking conditions. The colored light segments of the guidance light units are positioned and oriented such that the color which indicates affirmative landing, parking, or docking conditions either corresponds with the approach corridor or provides visual guidance to assist the pilot in guiding the vehicle into the approach corridor by defining outwardly extending guidance corridors. Both the approach corridor and the outwardly extending guidance corridors may be defined in both horizontal and vertical planes thus establishing a "tunnel" or channel.

In addition to defining an approach corridor or outwardly extending guidance corridors, the guidance light units may be used to provide landing zone information or vehicle position or attitude information relative to the approach corridor or landing zone.

DETAILED DESCRIPTION OF SPECIFIC EMBODIMENTS

Figure 1:
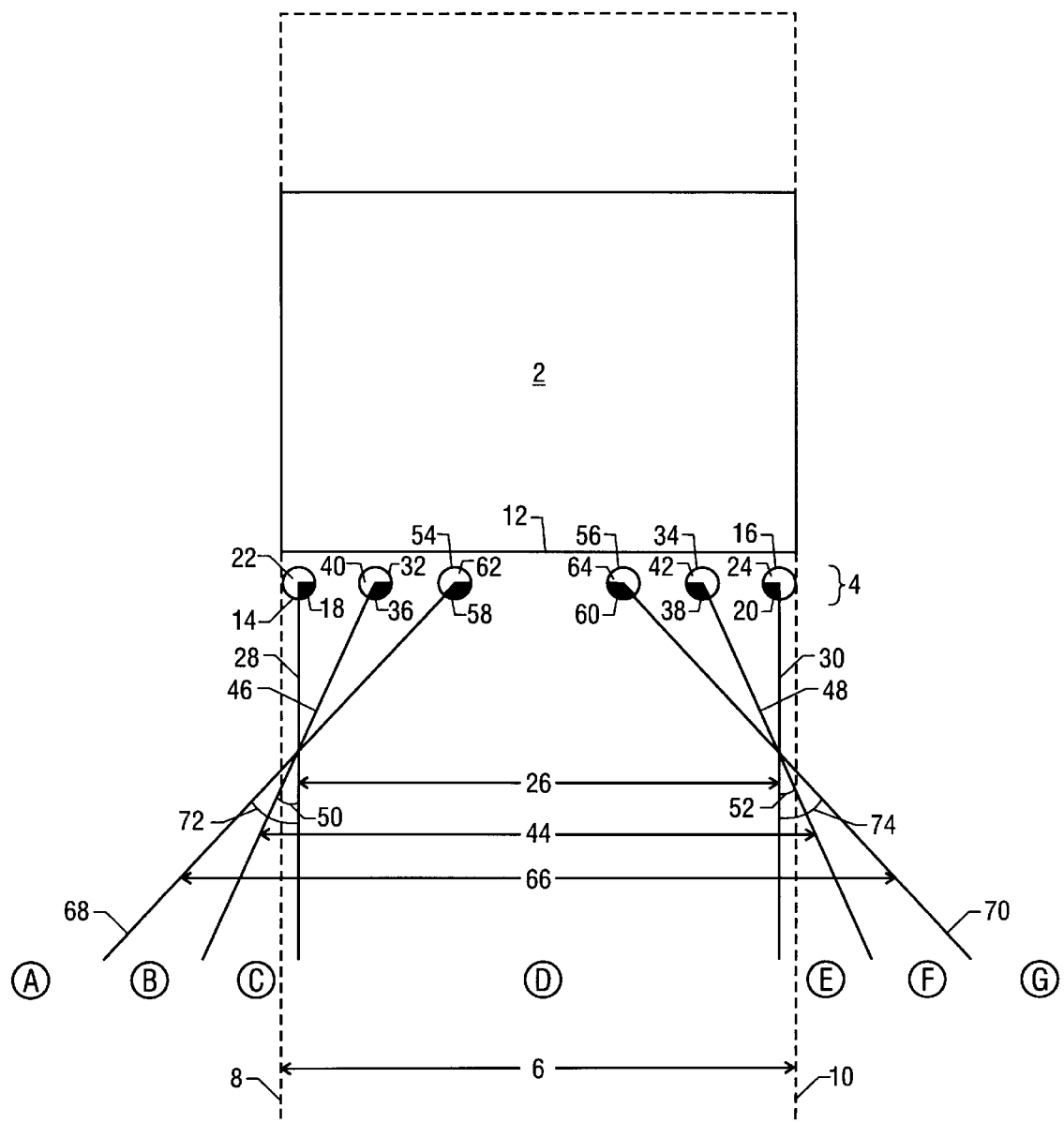
FIG. 1 is a schematic illustration of a first embodiment of the present invention.

FIG. 1 shows a landing zone 2 equipped with one embodiment of the present vehicular guidance system 4. An approach corridor 6, having approach corridor boundaries 8 and 10, projects outwardly from the approach end of the landing zone 12 and runs generally parallel to the landing zone 2. The system 4 is intended to guide a vehicle into the approach corridor 6 and to the landing zone 2.

The system 4 shown in FIG. 1 includes a first pair of guidance light units 14 and 16 located near the approach end of the landing zone 12. Each of the first pair of guidance light units 14 and 16 has affirmative color light segments 18 and 20 (which may be any color, for example green), and negative color light segments 22 and 24 (which may be any color, for example, red), respectively. Affirmative color light segments 18 and 20 of guidance light units 14 and 16 project light outwardly from the approach end of the landing zone 12 to define a first guidance corridor 26 having first guidance corridor boundaries 28 and 30, respectively. The first guidance corridor boundaries 28 and 30 are located substantially contiguous with the approach corridor boundaries 8 and 10.

Thus, if a pilot of a vehicle simultaneously sees both affirmative color light segments 18 and 20, as when the vehicle is in position D of FIG. 1, the system 4 indicates that the vehicle is in the approach corridor 6 and that the vehicle is in acceptable landing, parking, or docking position relative to the landing zone 2. Negative color light segments 22 or 24 indicate to the pilot that the vehicle is not in an acceptable landing, parking, or docking position relative to the first guidance corridor 26 and/or the approach corridor 6.

FIG. 1 also shows a second pair of guidance light units 32 and 34 located near the approach end of the landing zone 12. The second pair of guidance light units 32 and 34 is located between the first pair of guidance light units 14 and 16. Each of the second pair of guidance light units 32 and 34 has affirmative color light segments 36 and 38, and negative color light segments 40 and 42, respectively. Affirmative color light segments 36 and 38 project light outwardly from the first guidance corridor boundaries 28 and 30, respectively, to define a second guidance corridor 44 having second corridor boundaries 46 and 48. The light projecting outwardly from affirmative color light segments 36 and 38 also defines angles 50 and 52 between the first and second guidance corridor boundaries 28 and 46, and 30 and 48, respectively.

Angles 50 and 52 between the first and second guidance corridor boundaries 28 and 46, and 30 and 48 may be used to provide information to the pilot regarding the vehicle's position relative to the landing zone 2. For example, when the pilot's view of guidance light unit 32 switches from negative color light segment 40 to affirmative color light segment 36, the system 4 indicates the vehicle's position relative to the approach end of the landing zone 12 when the vehicle is moving a given distance parallel to the approach corridor 6. In a more specific example, if angle 50 is 13.25 degrees and the vehicle is moving 0.5 miles parallel to the approach corridor 6, the vehicle will be approximately 2.1 miles from the approach end of the landing zone 12 when the pilot's view of guidance light unit 32 switches from negative color light segment 40 to affirmative color light segment 36. The magnitude of angles 50 and 52 will depend upon factors such as vehicle type and landing zone location and conditions.

Thus, if a pilot of a vehicle simultaneously sees affirmative color light segments 36 and 38, as when the vehicle is in position C, D, or E of FIG. 1, the system 4 indicates that the vehicle is within the second guidance corridor 44. If the pilot does not see all affirmative color light segments, the vehicle must then be directed to the first guidance corridor 26 and the approach corridor 6 using guidance light units 14 and 16. If a pilot of a vehicle sees either negative color light segment 40 or 42, the system 4 indicates that the vehicle is not within the second guidance corridor 44.

FIG. 1 also shows a third pair of guidance light units 54 and 56 located near the approach end of the landing zone 12. The third pair of guidance light units 54 and 56 is located between the second pair of guidance light units 32 and 34. Each of the third pair of guidance light units 54 and 56 has affirmative color light segments 58 and 60, and negative color light segments 62 and 64, respectively. Affirmative color light segments 58 and 60 project light outwardly from the second guidance corridor boundaries 46 and 48, respectively, to define a third guidance corridor 66 having third guidance corridor boundaries 68 and 70. The light projecting outwardly from affirmative color light segments 58 and 60 also defines angles 72 and 74 between the first and third guidance corridor boundaries 28 and 68, and 30 and 70, respectively.

Angles 72 and 74 between the first and third guidance corridor boundaries 28 and 68, and 30 and 70 may be used to provide information to the pilot regarding the vehicle's position relative to the landing zone 2. For example, when pilot's view of guidance light unit 54 switches from negative color light segment 62 to affirmative color light segment 58, the system 4 indicates the vehicle's position relative to the approach end of the landing zone 12 when the vehicle is moving a given distance parallel to the approach corridor 6.

In a more specific example, if angle 72 is 26.5 degrees and the vehicle is moving 0.5 miles parallel to the approach corridor 6, the vehicle will be approximately 1 mile from the approach end of the landing zone 12 when the pilot's view of guidance light unit 54 switches from negative color light segment 62 to affirmative color light segment 58. Furthermore, the system 4 indicates that the turn towards the approach end of the landing zone should be approximately half-way complete when the pilot's view of guidance light unit 32 switches form negative color light segment 40 to affirmative color light segment 36, if the angle between the first and second guidance corridor boundaries 50 is approximately 13.25 degrees. The magnitude of angles 72 and 74 will depend upon factors such as vehicle type and landing zone location and conditions.

Thus, if a pilot of a vehicle simultaneously sees affirmative color light segments 58 and 60, as when the vehicle is in position B, C, D, E, or F of FIG. 1, the system 4 indicates that the vehicle is within the third guidance corridor 66. If the pilot does not see all affirmative color light segments, the vehicle must then be directed to the second and then first guidance corridors 44 and 26 (and/or the approach corridor 6) using guidance light units 32, 34, 14 and 16. If a pilot of a vehicle sees either negative color light segment 62 or 64, the system 4 indicates that the vehicle is not within the third guidance corridor 66.

While FIG. 1 shows a vehicular guidance system which utilizes three pairs of guidance light units, the present guidance system may be used with one, two, three, or more pairs of guidance light units. Regardless of whether the system 4, as shown in FIG. 1, is used with one, two, three, or more pairs of light units, the intensity of affirmative color light segments 18, 20, 36, 38, 58 and/or 60 and negative color light segments 22, 24, 40, 42, 62 and/or 64, is determined by numerous factors including the location of the landing zone 2 and the related visibility conditions. The intensity of guidance light units 14, 16, 32, 34, 54 and/or 56, may thus be provided as a design choice as long as the intensity is sufficient to provide guidance corridor boundaries 28, 30, 46, 48, 68 and/or 70, which extend far enough to guide vehicles to the approach corridor 6 and landing zone 2. Furthermore, while guidance light units 14, 16, 32, 34, 54 and/or 56, may comprise various light source orientations, in one embodiment the light source is either a vertically oriented light source or a point light source.

FIG. 1 illustrates that the pilot of a vehicle will view a combination of affirmative and negative color light segments, depending upon the position of the vehicle and the number of pairs of guidance light units being utilized in the vehicular guidance system. By using the affirmative and negative color light segments, the pilot will be able to direct the vehicle into the approach corridor 6 and to the landing zone 2. Referring to positions A, B, C, D, E, F and G as indicated in FIG. 1, Table 1 below illustrates the various combinations of light segments as used by the vehicle's pilot in the various positions.

In the table below "A" stands for the pilot seeing an affirmative color light segment and "N" stands for the pilot seeing a negative color light segment.

TABLE 1

| Position of the vehicle | Guidance light unit | | | | | |
|---|---|---|---|---|---|---|
| | 14 | 32 | 54 | 56 | 34 | 16 |
| A | N | N | N | A | A | A |
| B | N | N | A | A | A | A |
| C | N | A | A | A | A | A |
| D | A | A | A | A | A | A |
| E | A | A | A | A | A | N |
| F | A | A | A | A | N | N |
| G | A | A | A | N | N | N |

Figure 2:
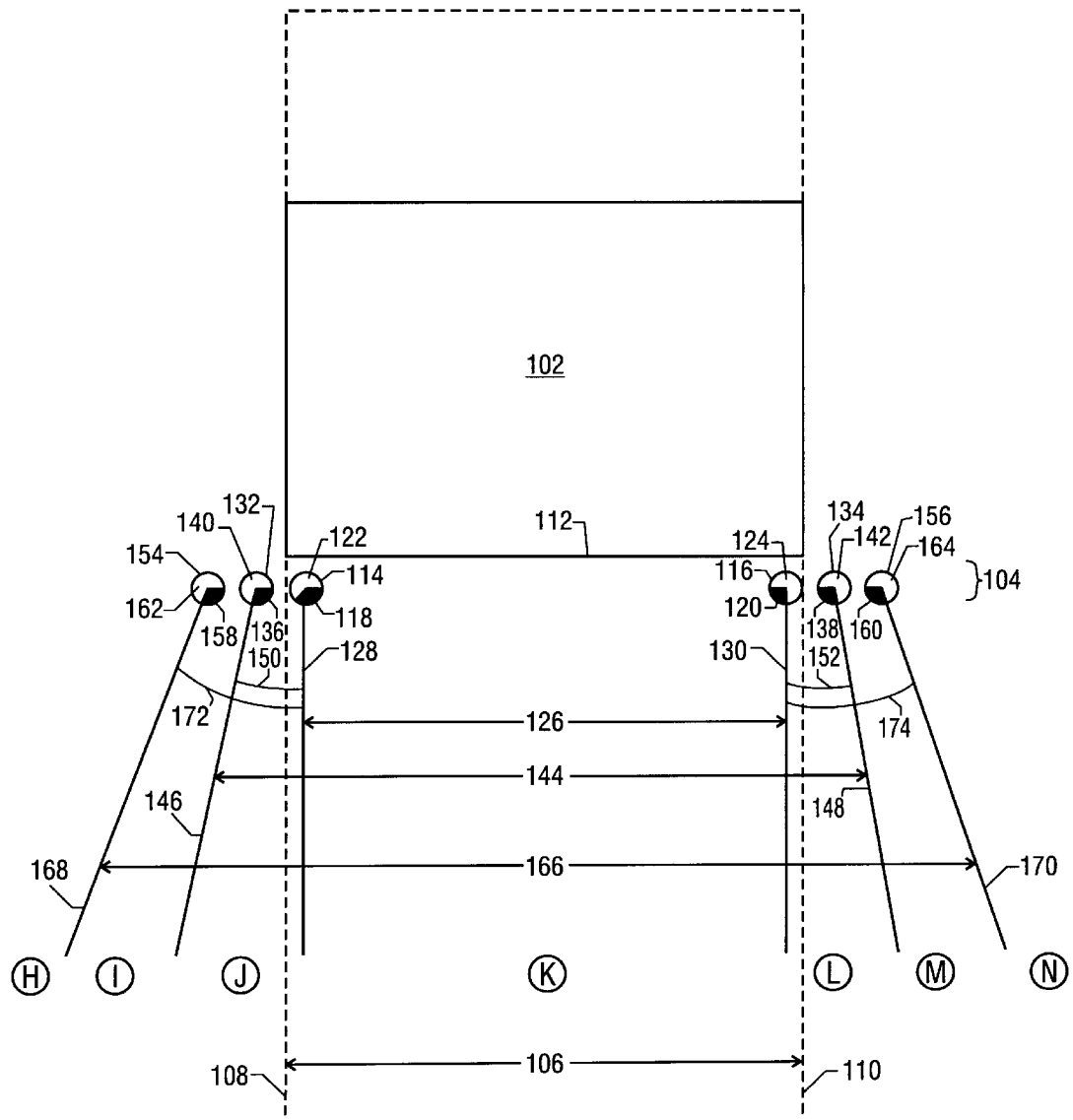
FIG. 2 is a schematic illustration of a second embodiment of the present invention.

FIG. 2 shows a landing zone landing zone 102 equipped with another embodiment of the present vehicular guidance system 104. An approach corridor 106, having approach corridor boundaries 108 and 110, projects outwardly from the approach end of the landing zone 112 and runs generally parallel to the landing zone 102. The system 104 is intended to guide a vehicle into the approach corridor 106 and to the landing zone 102.

The system 104 shown in FIG. 2 includes a first pair of guidance light units 114 and 116 located near the approach end of the landing zone 112. Each of the first pair of guidance light units 114 and 116 has affirmative color light segments 118 and 120 (which may be any color, for example green), and negative color light segments 122 and 124 (which may be any color, for example red), respectively. Affirmative color light segments 118 and 120 of guidance light units 114 and 116 project light outwardly from the approach end of the landing zone 112, define a first guidance corridor 126 having first guidance corridor boundaries 128 and 130 respectively. The first guidance corridor boundaries 128 and 130 are located substantially contiguous with the approach corridor boundaries 108 and 110.

Thus, if a pilot simultaneously sees both affirmative color light segments 118 and 120, as when the vehicle is in position K of FIG. 2, the system 104 indicates that the vehicle is in the approach corridor 106 and that the vehicle is an acceptable landing, parking, or docking position relative to the landing zone 102. Negative color light segments 122 or 124 indicate to the pilot that the vehicle is not in an acceptable landing, parking, or docking position relative to the first guidance corridor 126 and/or the approach corridor 106.

FIG. 2 also shows a second pair of guidance light units 132 and 134 located near the approach end of the landing zone 112. The first pair of guidance light units 114 and 116 is located between the second pair of guidance light units 132 and 134. Each of the second pair of guidance light units 132 and 134 has affirmative color light segments 136 and 138, and negative color light segments 140 and 142, respectively. Affirmative color light segments 136 and 138 project light outwardly from the first guidance corridor boundaries 128 and 130, respectively, to define a second guidance corridor 144 having second corridor boundaries 146 and 148. The light projecting outwardly from affirmative color light segments 136 and 138 also defines angles 150 and 152 between the first and second guidance corridor boundaries 128 and 146, and 130 and 148, respectively.

Angles 150 and 152 between the first and second guidance corridor boundaries 128 and 146, and 130 and 148 may be used to provide information to the pilot regarding the vehicle's position relative to the landing zone 102. For example, when the pilot's view of guidance light unit 132 switches from negative color light segment 140 to affirmative color light segment 136, the system 104 indicates the vehicle's position relative to the approach end of the landing zone 112 when the vehicle is moving a given distance parallel to the approach corridor 106. In a more specific example, if angle 150 is 13.25 degrees and the vehicle is moving 0.5 miles parallel to the approach corridor 106, the vehicle will be approximately 2.1 miles from the approach end of the landing zone 112 when the pilot's view of guidance light unit 132 switches from negative color light segment 140 to affirmative color light segment 136. The magnitude of angles 150 and 152 will depend upon factors such as vehicle type and landing zone location and conditions.

Thus, if a pilot of a vehicle simultaneously sees affirmative color light segments 136 and 138, as when the vehicle is in position J, K, or L of FIG. 2, the system 104 indicates that the vehicle is within the second guidance corridor 144. If the pilot does not see all affirmative color light segments, the vehicle must then be directed to the first guidance corridor 126 and the approach corridor 106 using light units 114 and 116. If a pilot of a vehicle sees either negative color light segment 140 or 142, the system 104 indicates that the vehicle is not within the second guidance corridor 144.

FIG. 2 also shows a third pair of guidance light units 154 and 156 located near the approach end of the landing zone 112. The second pair of guidance light units 132 and 134 is located between the third pair of guidance light units 154 and 156. Each of the third pair of guidance light units 154 and 156 has affirmative color light segments 158 and 160, and negative color light segments 162 and 164, respectively. Affirmative color light segments 158 and 160 project light outwardly from the second guidance corridor boundaries 146 and 148, respectively, to define a third guidance corridor 166 having third guidance corridor boundaries 168 and 170. The light projecting outwardly from affirmative color light segments 158 and 160 also defines angles 172 and 174 between the first and third guidance corridor boundaries 128 and 168, and 130 and 170, respectively.

Angles 172 and 174 between the first and third guidance corridor boundaries 128 and 168, and 130 and 170 may be used to provide information to the pilot regarding the vehicle's position relative to the landing zone 102. For example, when pilot's view of guidance light unit 154 switches from negative color light segment 162 to affirmative color light segment 158, the system 104 indicates the vehicle's position relative to the approach end of the landing zone 112 when the vehicle is moving a given distance parallel to the approach corridor 106. In a more specific example, if angle 172 is 26.5 degrees and the vehicle is moving 0.5 miles parallel to the approach corridor 106, the vehicle will be approximately 1 mile from the approach end of the landing zone 112 when the pilot's view of guidance light unit 154 switches from negative color light segment 162 to affirmative color light segment 158. Furthermore, the system 104 indicates that the turn towards the approach end of the landing zone should be approximately half-way complete when the pilot's view of guidance light unit 132 switches form negative color light segment 140 to affirmative color light segment 136, if the angle between the first and second guidance corridor boundaries 150 is approximately 13.25 degrees. The magnitude of angles 172 and 174 will depend upon factors such as vehicle type and landing zone location and conditions.

Thus, if a pilot simultaneously sees affirmative color light segments 158 and 160, as when the vehicle is in position I, J, K, L, or M of FIG. 2, the system 104 indicates that the vehicle is within the third guidance corridor 166. If the pilot does not see all affirmative color light segments, the vehicle must then be directed to the second and then first guidance corridors 144 and 126 (and/or the approach corridor 106) using guidance light units 132, 134, 114 and 116. If a pilot of a vehicle sees either negative color light segments 162 or 164, the system 104 indicates that the vehicle is not within the third guidance corridor 166.

While FIG. 2 shows a vehicular guidance system which utilizes three pairs of guidance light units, the present guidance system may be used with one, two, three or more pairs of guidance light units. Regardless of whether the system 104, as shown in FIG. 2, is used with one, two, three or more pairs of guidance light units, the intensity of affirmative color light segments 118, 120, 136, 138, 158 and/or 160, and negative color light segments 122, 124, 140, 142, 162 and/or 164, is determined by numerous factors including the location of the landing zone 102 and related visibility conditions. The intensity of guidance light units 114, 116, 132, 134, 154, and/or 156, may thus be provided as a design choice as long as the intensity is sufficient to provide guidance corridor boundaries 128, 130, 146, 148, 168 and/or 170, which extend far enough to guide vehicles to the approach corridor 106 and landing zone 102. Furthermore, while guidance light units 114, 116, 132, 134, 154 and/or 156, may comprise various light source orientations, in one embodiment, the light source is either a vertically oriented light source or a point light source.

FIG. 2 illustrates that the pilot of a vehicle will view a combination of affirmative and negative color light segments, depending upon the position of the vehicle and the number of pairs of guidance light units being utilized in the vehicular guidance system. By using the affirmative and negative color light segments, the pilot will be able to direct the vehicle into the approach corridor 106 and to the landing zone 102. Referring to positions H, I, J, K, L, M and N as indicated in FIG. 2, Table 2 below illustrates the various combinations of light segments as used by the vehicle's pilot in the various positions.

In the table below "A" stands for the pilot seeing an affirmative color light segment and "N" stands for the pilot seeing a negative color light segment.

TABLE 2

| Position of the vehicle | Guidance light unit | | | | | |
|---|---|---|---|---|---|---|
| | 154 | 132 | 114 | 116 | 134 | 156 |
| H | N | N | N | A | A | A |
| I | A | N | N | A | A | A |
| J | A | A | N | A | A | A |
| K | A | A | A | A | A | A |
| L | A | A | A | N | A | A |
| M | A | A | A | N | N | A |
| N | A | A | A | N | N | N |

Figure 3:
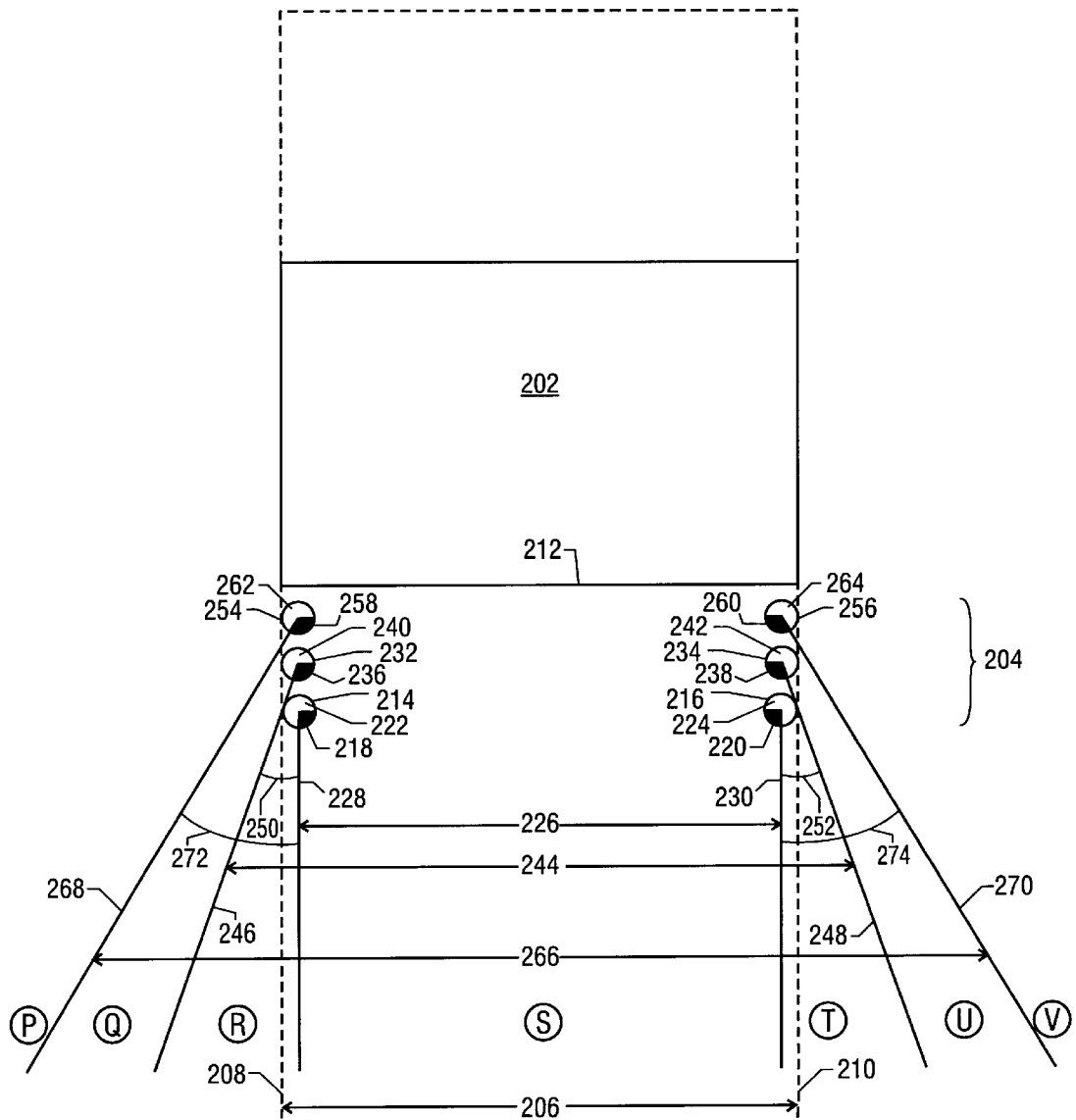
FIG. 3 is a schematic illustration of a third embodiment of the present invention.

FIG. 3 shows landing zone 202 equipped with one embodiment of the present vehicular system 204. An approach corridor 206, having approach corridor boundaries 208 and 210, projects outwardly from the approach end of the landing zone 212 and runs generally parallel to the landing zone 202. The system 204 is intended to guide a vehicle into the approach corridor 206 and to the landing zone 202.

While FIG. 3 shows the guidance light units arranged in rows parallel to the landing zone, the guidance light units could be arranged in various configurations to provide the same information. For example, the guidance light units could be arranged in a vertical column. FIG. 3 should be read to allow the pairs of guidance light units to be arranged in any order, (front to back or back to front/top to bottom or bottom to top).

With the foregoing in mind, FIG. 3 includes a first pair of guidance light units 214 and 216 located near the approach end of the landing zone 212. Each of the first pair of guidance light units 214 and 216 has affirmative color light segments 218 and 220 (which may be any color, for example green), and negative color light segments 222 and 224 (which may be any color, for example red), respectively. Affirmative color light segments 218 and 220 of guidance light units 214 and 216 project light outwardly from the approach end of the landing zone 212 to define a first guidance corridor 226 having first guidance corridor boundaries 228 and 230, respectively. The first guidance corridor boundaries 228 and 230 are located substantially contiguous with the approach corridor boundaries 208 and 210.

Thus, if a pilot of a vehicle simultaneously sees both affirmative color light segments 218 and 220, as when the vehicle is in position S of FIG. 3, the system 204 indicates that the vehicle is in the approach corridor 206 and that the vehicle is in acceptable landing, parking, or docking position relative to the landing zone 202. Negative color light segments 222 or 224 indicate to the pilot that the vehicle is not in an acceptable landing, parking, or docking position relative to the first guidance corridor 226 and/or the approach corridor 206.

FIG. 3 also shows a second pair of guidance light units 232 and 234 located near the approach end of the landing zone 212. The second pair of guidance light units 232 and 234 is located behind the first pair of guidance light units 214 and 216. Each of the second pair of guidance light units 232 and 234 has affirmative color light segments 236 and 238, and negative color light segments 240 and 242, respectively. Affirmative color light segments 236 and 238 project light outwardly from the first guidance corridor boundaries 228 and 230, respectively, to define a second guidance corridor 244 having second corridor boundaries 246 and 248. The light projecting outwardly from affirmative color light segments 236 and 238 also defines angles 250 and 252 between the first and second guidance corridor boundaries 228 and 246, and 230 and 248, respectively.

Angles 250 and 252 between the first and second guidance corridor boundaries 228 and 246, and 230 and 248 may be used to provide information to the pilot regarding the vehicle's position relative to the landing zone 202. For example, when the pilot's view of guidance light unit 232 switches from negative color light segment 240 to affirmative color light segment 236, the system 204 indicates the vehicle's position relative to the approach end of the landing zone 212 when the vehicle is moving a given distance parallel to the approach corridor 206. In a more specific example, if angle 250 is 13.25 degrees and the vehicle is moving 0.5 miles parallel to the approach corridor 206, the vehicle will be approximately 2.1 miles from the approach end of the landing zone 212 when the pilot's view of guidance light unit 232 switches from negative color light segment 240 to affirmative color light segment 236. The magnitude of angles 250 and 252 will depend upon factors such as vehicle type and landing zone location and conditions.

Thus, if a pilot of a vehicle simultaneously sees affirmative color light segments 236 and 238, as when the vehicle is in position R, S, or T, the system 204 indicates that the vehicle is within the second guidance corridor 244. If the pilot does not see all affirmative color light segments, the vehicle must then be directed to the first guidance corridor 226 and the approach corridor 206 using guidance light units 214 and 216. If a pilot of a vehicle sees either negative color light segment 240 or 242, the system 204 indicates that the vehicle is not within the second guidance corridor 244.

FIG. 3 also shows a third pair of guidance light units 254 and 256 located near the approach end of the landing zone 212. The third pair of guidance light units 254 and 256 is located behind the second pair of guidance light units 232 and 234. Each of the third pair of guidance light units 254 and 256 has affirmative color light segments 258 and 260, and negative color light segments 262 and 264, respectively. Affirmative color light segments 258 and 260 project light outwardly from the second guidance corridor boundaries 246 and 248, respectively, to define a third guidance corridor 266 having third guidance corridor boundaries 268 and 270. The light projecting outwardly from affirmative color light segments 258 and 260 also defines angles 272 and 274 between the first and third guidance corridor boundaries 228 and 268, and 230 and 270, respectively.

Angles 272 and 274 between the first and third guidance corridor boundaries 228 and 268, and 230 and 270 may be used to provide information to the pilot regarding the vehicle's position relative to the landing zone 202. For example, when pilot's view of guidance light unit 254 switches from negative color light segment 262 to affirmative color light segment 258, the system 204 indicates the vehicle's position relative to the approach end of the landing zone 212 when the vehicle is moving a given distance parallel to the approach corridor 206. In a more specific example, if angle 272 is 26.5 degrees and the vehicle is moving 0.5 miles parallel to the approach corridor 206, the vehicle will be approximately 1 mile from the approach end of the landing zone 212 when the pilot's view of guidance light unit 254 switches from negative color light segment 262 to affirmative color light segment 258. Furthermore, the system 204 indicates that the turn towards the approach end of the landing zone should be approximately half-way complete when the pilot's view of guidance light unit 232 switches form negative color light segment 240 to affirmative color light segment 236, if the angle between the first and second guidance corridor boundaries 250 is approximately 13.25 degrees. The magnitude of angles 272 and 274 will depend upon factors such as vehicle type and landing zone location and conditions.

Thus, if a pilot of a vehicle simultaneously sees affirmative color light segments 258 and 260, as when the vehicle is in position Q, R, S, T, or U of FIG. 3, the system 204 indicates that the vehicle is within the third guidance corridor 266. If the pilot does not see all affirmative color light segments, the vehicle must then be directed to the second and then first guidance corridors 244 and 226 (and/or approach corridor 206) using guidance light units 232, 234, 214 and 216. If a pilot of a vehicle sees either negative color light segment 262 or 264, the system 204 indicates that the vehicle is not within the third guidance corridor 266.

While FIG. 3 shows a vehicular guidance system which utilizes three pairs of guidance light units, the present guidance system may be used with one, two, three, or more pairs of guidance light units. Regardless of whether the system 204, as shown in FIG. 3, is used with one, two, three, or more pairs of light units, the intensity of affirmative color light segments 218, 220, 236, 238, 258 and/or 260, and negative color light segments 222, 224, 240, 242, 262 and/or 264, is determined by numerous factors including the location of the landing zone 202 and the related visibility conditions. The intensity of guidance light units 214, 216, 232, 234, 254 and/or 256, may thus be provided as a design choice as long as the intensity is sufficient to provide guidance corridor boundaries 228, 230, 246, 248, 268 and/or 270, which extend far enough to guide vehicles to the approach corridor 206 and landing zone 202. Furthermore, while guidance light units 214, 216, 232, 234, 254, and/or 256, may comprise various light source orientations, in one embodiment the light source is either a vertically oriented light source or a point light source.

FIG. 3 illustrates that the pilot of a vehicle will view a combination of affirmative and negative color light segments, depending upon the position of the vehicle and the number of pairs of guidance light units being utilized in the vehicular guidance system. By using the affirmative and negative color light segments, the pilot will be able to direct the vehicle into the approach corridor 206 and to the landing zone 202. Referring to positions P, Q, R, S. T, U and V as indicated in FIG. 3, Table 3 below illustrates the various combinations of light segments as used by the vehicle's pilot in various positions.

In the table below "A" stands for the pilot seeing an affirmative color light segment and "N" stands for the pilot seeing a negative color light segment.

TABLE 3

| Position of the vehicle | Guidance light unit | | | | | |
|---|---|---|---|---|---|---|
| | 214 | 232 | 254 | 256 | 234 | 216 |
| P | N | N | N | A | A | A |
| Q | N | N | A | A | A | A |
| R | N | A | A | A | A | A |
| S | A | A | A | A | A | A |
| T | A | A | A | A | A | N |
| U | A | A | A | A | N | N |
| V | A | A | A | N | N | N |

What is claimed is:

1. A guidance system for guiding a vehicle into an approach corridor relative to a landing zone, comprising:
   a first pair of guidance light units near the landing zone, each of the first pair of guidance light units having an affirmative color light segment and a negative color light segment, the affirmative color light segments from the first pair of guidance light units defining a first guidance corridor having first guidance corridor boundaries; and
   a second pair of guidance light units near the landing zone, each of the second pair of guidance light units having an affirmative color light segment and a negative color light segment, the affirmative color light segments from the second pair of guidance light units defining a second guidance corridor having second guidance corridor boundaries projecting outwardly from the first guidance corridor boundaries to define angles between the first and second guidance corridor boundaries.

2. The guidance system of claim 1 further comprising a third pair of guidance light units near the landing zone, each of the third pair of guidance light units having an affirmative color light segment and a negative color light segment, the affirmative color light segments from the third pair of guidance light units defining a third guidance corridor having third guidance corridor boundaries projecting outwardly from the second guidance corridor boundaries to define angles between the first and third guidance corridor boundaries.

3. The guidance system of claim 1 wherein the angles between the first and second guidance corridor boundaries provide information to determine the vehicle's position relative to the landing zone.

4. The guidance system of claim 2 wherein the angles between the first and third guidance corridor boundaries provide information to determine the vehicle's position relative to the landing zone.

5. The guidance system of claim 1 wherein the second pair of guidance light units is located between the first pair of guidance light units.

6. The guidance system of claim 2 wherein the third pair of guidance light units is located between the second pair of guidance light units.

* * * * *